(12) United States Patent
Nguyen

(10) Patent No.: US 7,296,069 B2
(45) Date of Patent: Nov. 13, 2007

(54) METHOD AND SYSTEM FOR NETWORK FAULT MONITORING WITH LINUX

(75) Inventor: Hoa Nguyen, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 645 days.

(21) Appl. No.: 10/140,214

(22) Filed: May 8, 2002

(65) Prior Publication Data
US 2003/0212784 A1    Nov. 13, 2003

(51) Int. Cl.
*G06F 15/173* (2006.01)
(52) U.S. Cl. .......................................... 709/223; 714/4
(58) Field of Classification Search ................ 709/224, 709/223; 714/4, 44, 48
See application file for complete search history.

(56) References Cited

U.S. PATENT DOCUMENTS

| | | | |
|---|---|---|---|
| 6,101,180 A * | 8/2000 | Donahue et al. ............ 370/352 |
| 6,343,320 B1 * | 1/2002 | Fairchild et al. ............ 709/224 |
| 6,516,352 B1 * | 2/2003 | Booth et al. ................. 709/250 |
| 6,701,449 B1 * | 3/2004 | Davis et al. ................... 714/4 |
| 6,718,383 B1 * | 4/2004 | Hebert ........................ 709/224 |
| 7,024,403 B2 * | 4/2006 | Kyler ............................. 707/3 |
| 2002/0112050 A1 * | 8/2002 | Ullmann et al. ............ 709/224 |

* cited by examiner

*Primary Examiner*—Larry D. Donaghue
*Assistant Examiner*—Asghar Bilgrami

(57) ABSTRACT

A method and system for monitoring faults in network interface cards on networked computer systems or devices. The system includes a means for establishing an electrical connection to a computer network; a means for controlling data sent across the establishing means; a means for directly querying the status of the establishing means; and a means for tracking the status of the establishing means. The method includes steps for initializing data structures for tracking the status of one or more network interface cards to be monitored; initiating monitoring of the one or more network interface cards; ascertaining a configurable polling interval; determining if a shutdown condition has occurred; monitoring the status of the one or more network interface cards when a shutdown condition has not occurred; and clearing all resources when a shutdown condition has occurred.

18 Claims, 5 Drawing Sheets

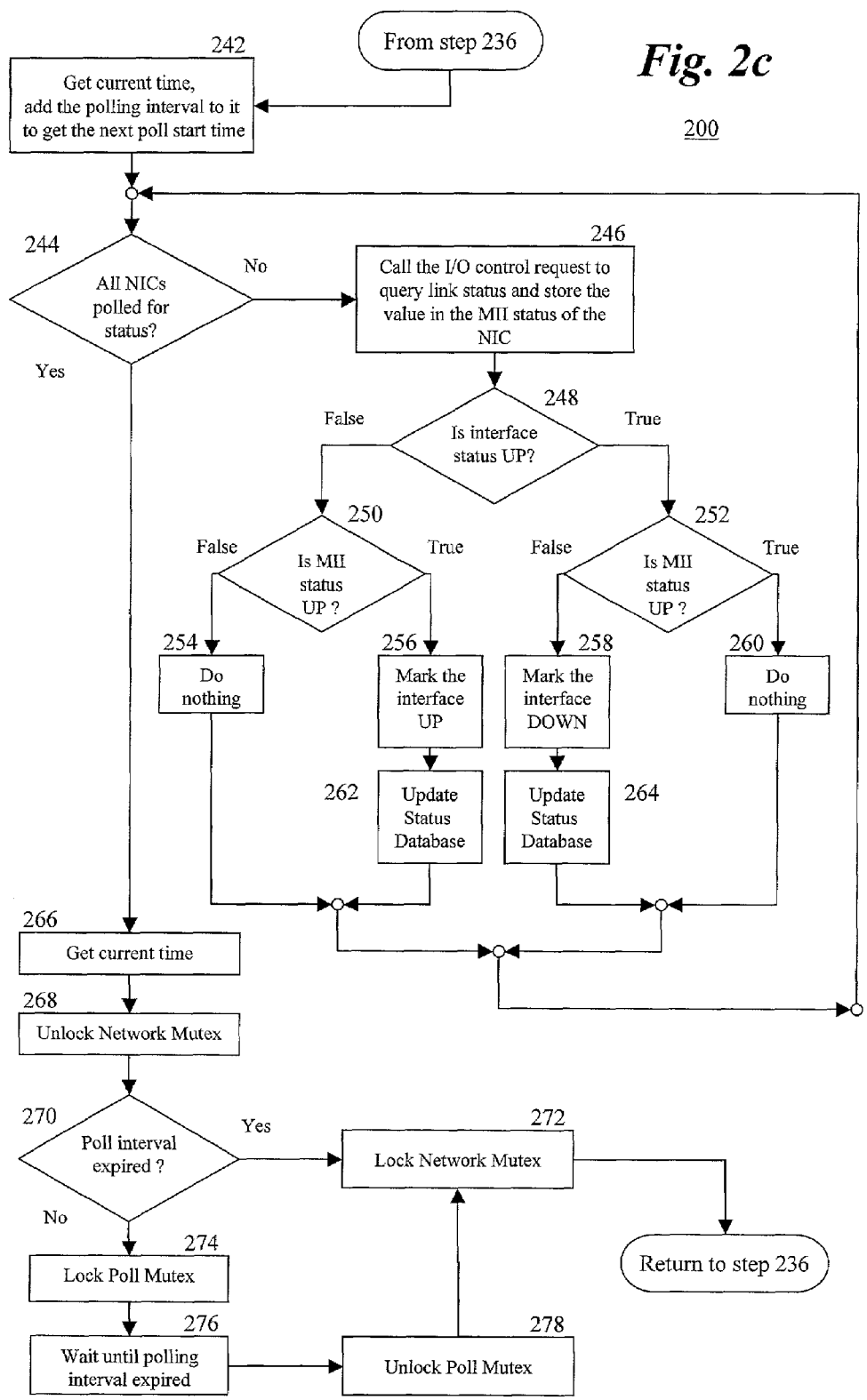

METHOD AND SYSTEM FOR NETWORK FAULT MONITORING WITH LINUX

TECHNICAL FIELD

The technical field relates to computer network fault monitoring.

BACKGROUND

In the field of networked computer systems high availability, one form of high availability software that is provided is known as clustering software. Clustering software manages the networking operations of a group, or cluster, of networked computer systems, and attempts to ensure the highest availability of running applications for external system users despite networking hardware or software failures. One of the functions of clustering software is to detect and recover from a network fault such as a link failure, a failure of a connection to the computer network, in a network interface card ("NIC") configured for operation in a computer system on the cluster of networked computers. This function is often referred to as network fault monitoring.

Clustering software systems have been designed and built for various types of computer networking protocols, including Ethernet, and for various network computer operating systems, including versions of UNIX such as Hewlett-Packard's HP-UX. In the HP-UX operating system, network fault monitoring is accomplished through the use of the Data Link Provider Interface ("DLPI"). The DLPI is a set of Application Programming Interfaces ("API") that operate at the second lowest, or data link, layer of a computer system's networking protocol stack.

The layers of a networking protocol stack, according to the Open Systems Interconnect ("OSI") seven layer model (established by the International Organization for Standardization ("ISO") in 1978), typically consist of the following layers moving from bottom (closest to the hardware) to top (closest to the user): a physical layer comprising the networking hardware used to make connections to the network (example physical layer protocols include token ring and bus); a data link layer which splits data into frames for sending on to the physical layer and receives acknowledgement frames, and also performs error checking (the data link layer may comprise the driver software for the NIC); a network layer, or communications subnet layer, which determines the routing of data packets from sender to receiver (the most common network layer protocol is Internet Protocol ("IP")); a transport layer, or "host-host layer," which determines how to minimize communications errors and establish point to point connections between two host computers such that messages between the two host computers will arrive uncorrupted and in the correct order (an exemplary transport layer protocol is Transmission Control Protocol ("TCP"), another is User Datagram Protocol ("UDP")); a session layer; a presentation layer; and an application layer which is concerned with the user's view of the network.

DLPI is used by the clustering software on the HP-UX operating system to monitor for network faults. The clustering software generates DLPI traffic across all NICs being monitored and collects resulting data in a Management Information Base ("MIB"), compliant with the Simple Network Management Protocol ("SNMP"), for all data packets sent and received by the NICs. The statistics tracked by the MIB can then be used to determine if each NIC is up or if it is down.

SUMMARY

In one respect, what is described is a system for monitoring network faults using a LINUX operating system. The system includes a means for establishing an electrical connection to a computer network; means for controlling data sent across the establishing means; means for directly querying the status of the establishing means; and means for tracking the status of the establishing means.

In another respect, what is described is a method for monitoring network faults using a LINUX operating system. The method includes steps for initializing data structures for tracking the status of one or more network interface cards to be monitored; initiating monitoring of the one or more network interface cards; ascertaining a configurable polling interval; determining if a shutdown condition has occurred; monitoring the status of the one or more network interface cards when a shutdown condition has not occurred; and clearing all resources when a shutdown condition has occurred.

In yet another respect, what is described is a computer-readable medium on which is embedded a program. The embedded program includes instructions for executing the above method.

Those skilled in the art will appreciate these and other advantages and benefits of various embodiments of the invention upon reading the following detailed description of an embodiment with reference to the below-listed drawings.

DESCRIPTION OF THE DRAWINGS

The detailed description will refer to the following drawings, wherein like numerals refer to like elements, and wherein:

FIG. 1b shows additional detail of the embodiment of the system shown in FIG. 1a;

FIG. 2c is a flowchart showing another portion of the method of FIG. 2a in more detail.

DETAILED DESCRIPTION

Network fault monitoring on the HP-UX operating system is accomplished through the use of the DLPI and interpretation of MIB statistics maintained in the NIC driver. Implementing a similar network fault monitoring system and method on the LINUX operating system requires another solution since LINUX does not utilize DLPI.

The LINUX operating system provides, in its data link layer, a set of Input/Output ("I/O") Control Requests (system calls enabling a service provided by the operating system with respect to input and output operations) not provided in HP-UX. These I/O control requests conform to and utilize the Media Independent Interface ("MII"), an interface defined by the IEEE to perform various link-level control operations between networking devices connected in an Ethernet network. Among the I/O control requests available in LINUX are two specific ones referred to as SIOCDEVPRIVATE and a newer SIOCGMIIPHY I/O control requests. The I/O control requests may read an MII status word directly from a transceiver residing on a network interface card ("NIC"). Using this capability, a network fault monitoring system may determine whether a NIC is up or down (operating or failed) based on a value of an argument passed from the MII status word into the I/O control request system call.

Figure 1A:
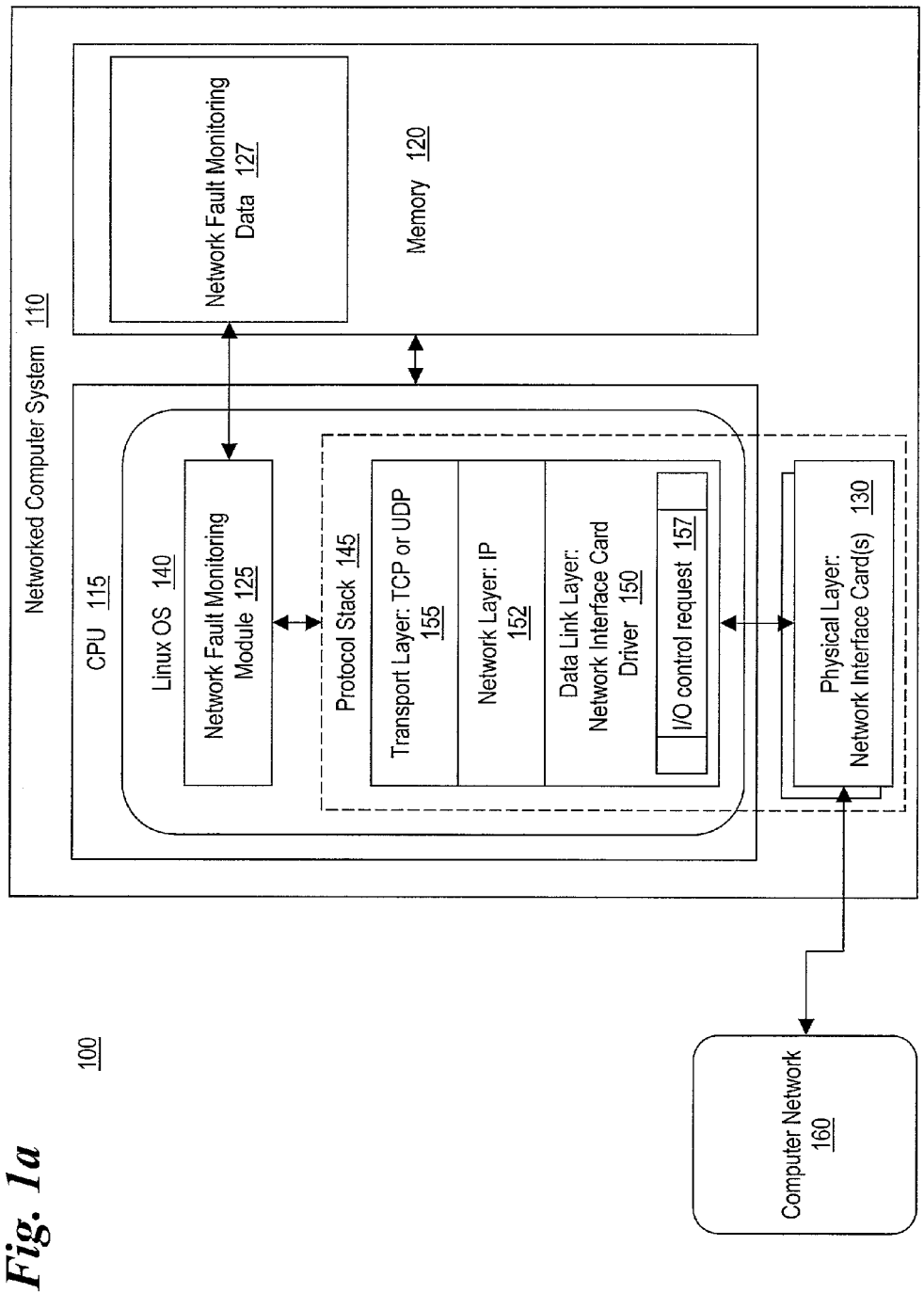
FIG. 1a shows one embodiment of a system according to the invention.

FIG. 1a shows one embodiment of a system 100 for monitoring network interface cards for faults using a LINUX operating system. The system 100 includes a networked computer system 110 connected to a computer network 160 through one or more network interface cards 130 installed in the networked computer system 110. The networked computer system 110 further includes a CPU 115 connected to a memory 120. The CPU 115 runs a LINUX operating system 140. The LINUX operating system 140 further includes a protocol stack 145 that enables the networked computer system 110 to communicate across the network 160. This protocol stack 145 conforms to the Open Systems Interconnect ("OSI") reference model for a seven-layer networking protocol stack. The protocol stack 145 includes several layers: a transport layer 155 (using TCP or UDP as exemplary transport protocols); a network layer 152 (using IP as an exemplary network protocol); and a data link layer 150 wherein the data link layer 150 may comprise a network interface card driver module. The protocol stack is completed by a physical layer, the one or more network interface cards 130. The data link layer 150 controls and communicates with the network interface cards 130, permitting communication of the networked computer system 110 with the computer network 160. The data link layer 150 may include one or more I/O control requests 157 that permit querying of the status of the one or more network interface cards 130. The system 100 may operate in conjunction with other modules (not shown) in a clustering software system (not shown).

The system 100 may also include a network fault monitoring software module 125 running on the CPU 115 under the control of the LINUX operating system 140. The network fault monitoring module 125 is connected to and communicates with the protocol stack 145 to determine the status of the one or more network interface cards 130. The network fault monitoring module 125 also is connected to and communicates with a network fault monitoring data 127 residing in the memory 120. The network fault monitoring data 127 serves to track the status of the one or more network interface cards 130 and make this status available to other software modules that may run on the CPU 115.

Figure 1B:
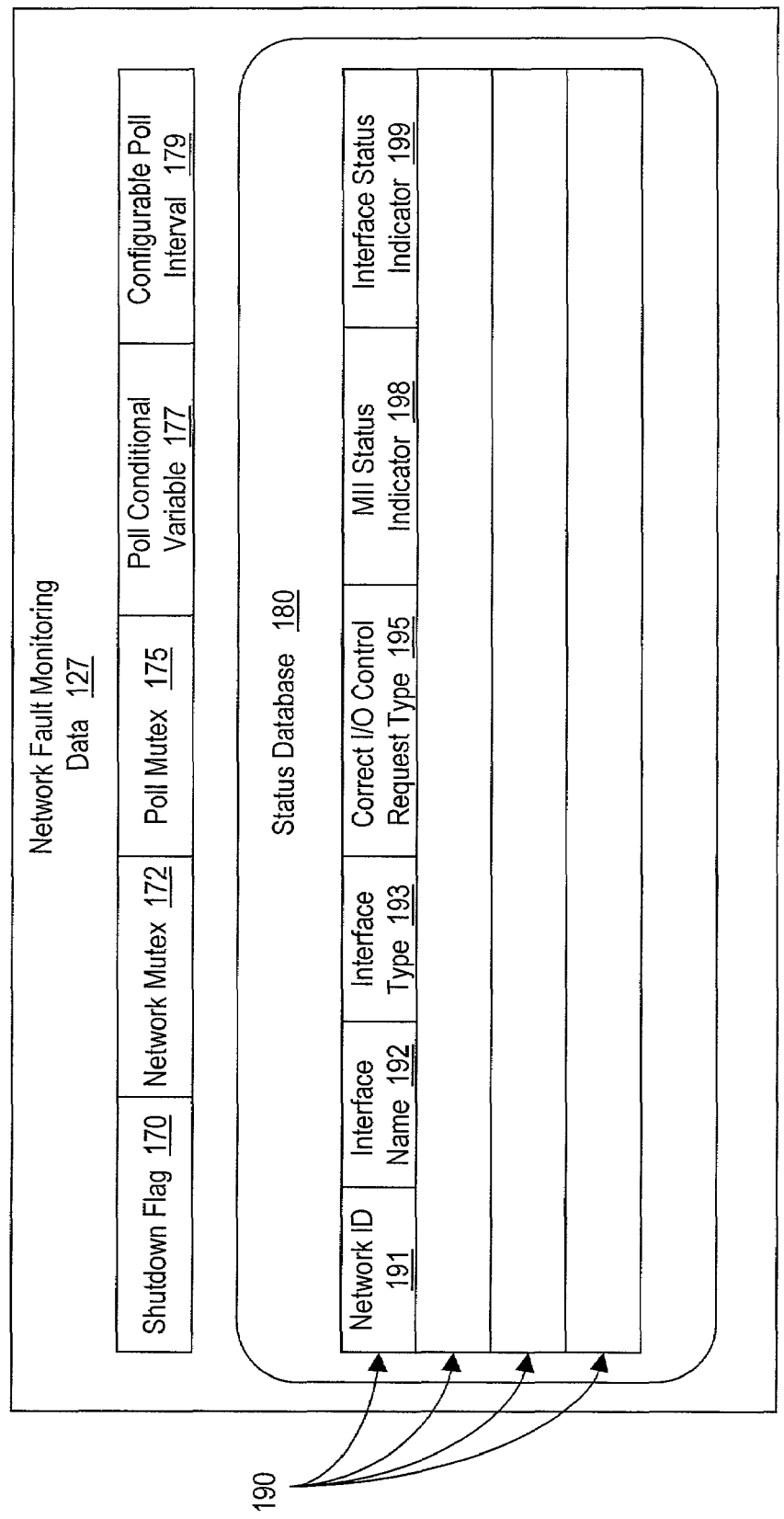

FIG. 1b shows additional detail of the embodiment of the system 100 shown in FIG. 1a. FIG. 1b illustrates one embodiment of the structure of the network fault monitoring data 127. The network fault monitoring data 127 includes storage for several global variables utilized by the network fault monitoring module 125. These global variables include a shutdown flag 170, a network mutex 172, a poll mutex 175, a poll conditional variable 177, a datagram socket descriptor 178, and a configurable poll interval 179.

In addition, the network fault monitoring data 127 may include an interface data structures list 180 for tracking a number of variables regarding the status of each of the one or more network interface cards 130. The interface data structures list 180 comprises one or more interface data structures 190, one for each of the one or more network interface cards 130 being monitored by the network fault monitoring software module 125. Each interface data structure 190 may include a network identification field 191, a network interface name 192, a network interface type 193, a network interface index 194, a network interface card hardware path 196, and a storage location for a correct I/O control request type 195. Each interface data structure 190 may also include an MII status indicator 198 and an interface status indicator 199. The data in each interface data structure 190 and the global variables are used by the method 200, described below, for determining and tracking the status of the one or more network interface cards 130.

In one embodiment of the invention, the network fault monitoring data 127 may further include a status reporting database 185 which may be accessed by other software modules running on the CPU 115 to obtain information on the status of the one or more network interface cards 130. The status reporting database 185 may comprise one or more database entries 186, each corresponding to one of the one or more interface data structures 190, and thus representing each of the one or more network interface cards 130 being monitored by the network fault monitoring software module 125. Each database entry 186 may include fields indicating a type 187, a key 188, and a value 189. The type 187 indicates a database entry type for a network interface card 130. The key 188 specifies, and corresponds to, the unique hardware path 196 for one of the one or more network interface cards 130. The value 189 represents the status of one of the one or more network interface cards 130 derived from the interface status indicator 199 from the corresponding interface data structure 190 described above.

The operation of the elements of the system 100 to monitor network interface cards 130 for faults using the LINUX operating system is best illustrated by the steps of the method 200 described below.

Figure 2A:
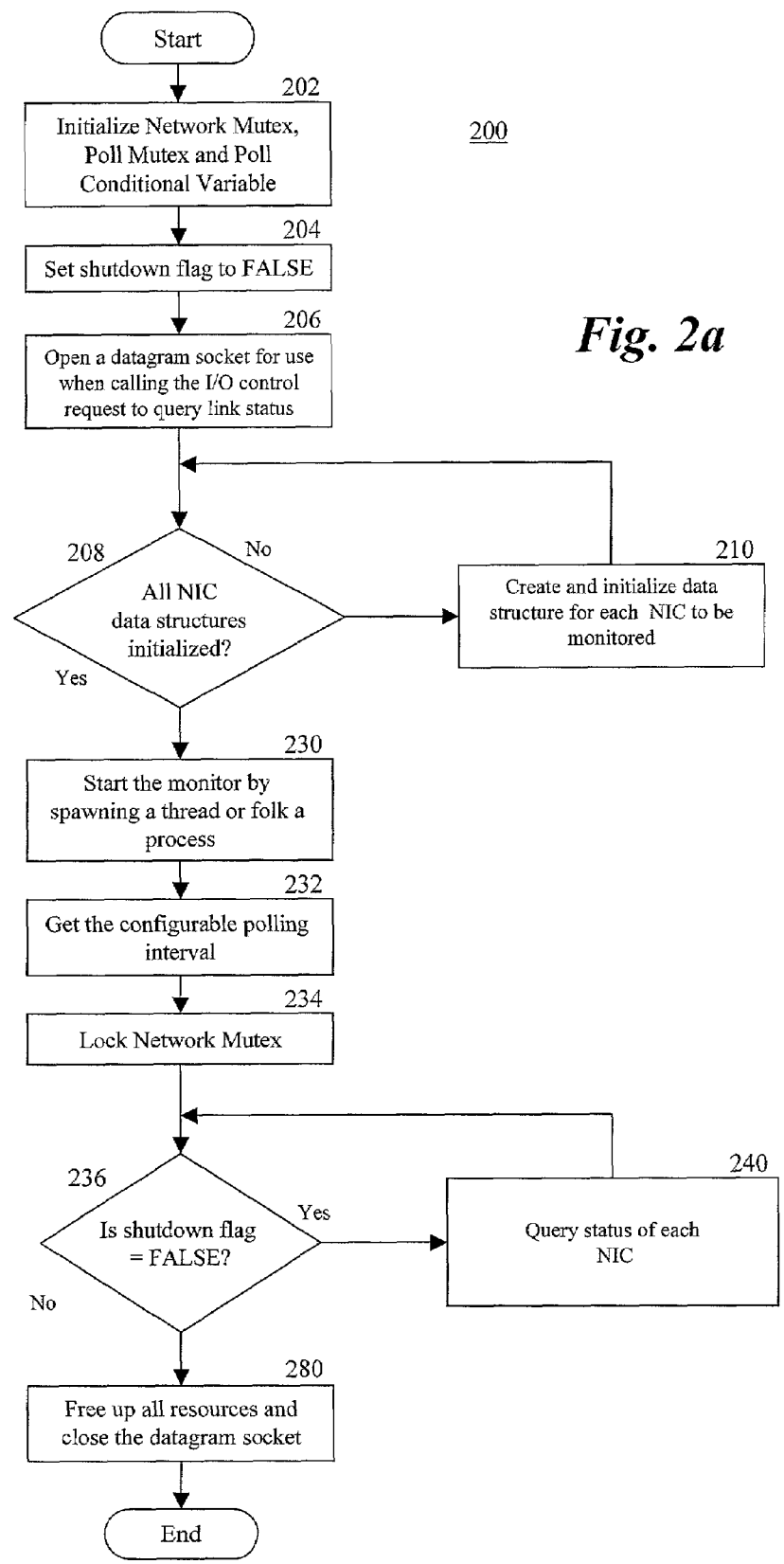
FIG. 2a is a flowchart illustrating one embodiment of a method according to the invention.

FIG. 2a is a flowchart illustrating one embodiment of a method 200 for monitoring network interface cards for faults using the LINUX operating system. The steps of the method 200 may be implemented by the network fault monitoring module 125 in the system 100 where all network interface cards 130 have been discovered and initialized. The method 200 begins by initializing the network mutex 172, the poll mutex 175, and the poll conditional variable 177 (step 202). A mutex is a mutual exclusion object that allows multiple threads to synchronize access to shared resources. The shutdown flag 170 is then set to false (step 204). The use of the shutdown flag 170 permits the method 200, as implemented in the network fault monitoring module 125, to run continuously until a shutdown condition occurs. The network fault monitoring module 125 may then open a datagram socket 178 for use in calling an I/O (input/output) control request 157 (step 206).

With the data socket open, the method 200 proceeds to loop through each of the network interface cards 130 that will be monitored by the method 200 (step 208). For each network interface card 130 that will be monitored, the network fault monitoring module 125 creates and initializes a data structure stored in the network fault monitoring data 127 (step 210).

Upon completing the creation and initialization of data structures for each network interface card 130 (steps 208 and 210), the method 200 then starts to monitor the status of the network interface cards 130 by spawning a thread, or forking a process, to execute the monitoring steps (step 230). The configurable polling interval 179 is then retrieved (step 232). The value of the configurable polling interval 179 is a period of time, configurable by a user of the system 100, during which the monitoring process is executed. In other words, if the value of the configurable polling interval 179 is two seconds, which may be the default value in one embodiment of the invention, then the method 200 executes the steps (described below) for monitoring the network interface cards 130 once every two seconds. Just prior to entering the loop to monitor the network interface cards 130, the method 200 locks the network mutex 172 (step 234). The network mutex 172 is locked to protect all monitoring data from use by other modules, threads or processes running in the system 100.

The method 200 then enters an infinite FOR loop, wherein the loop has as its first step the testing of the condition of the shutdown flag 170 (step 236). If the shutdown flag 170 is set to false, as it should be from step 204 unless a shutdown condition has been initiated by a user or other process, the method 200 will proceed to query the status of each network interface card 130 (step 240). The monitoring process of the method 200 may thus only be shutdown by setting the shutdown flag 170 to true. If the shutdown flag 170 is set to true, the method proceeds instead to free up all resources and close the opened datagram socket 178 (step 280) and then ends.

Figure 2B:
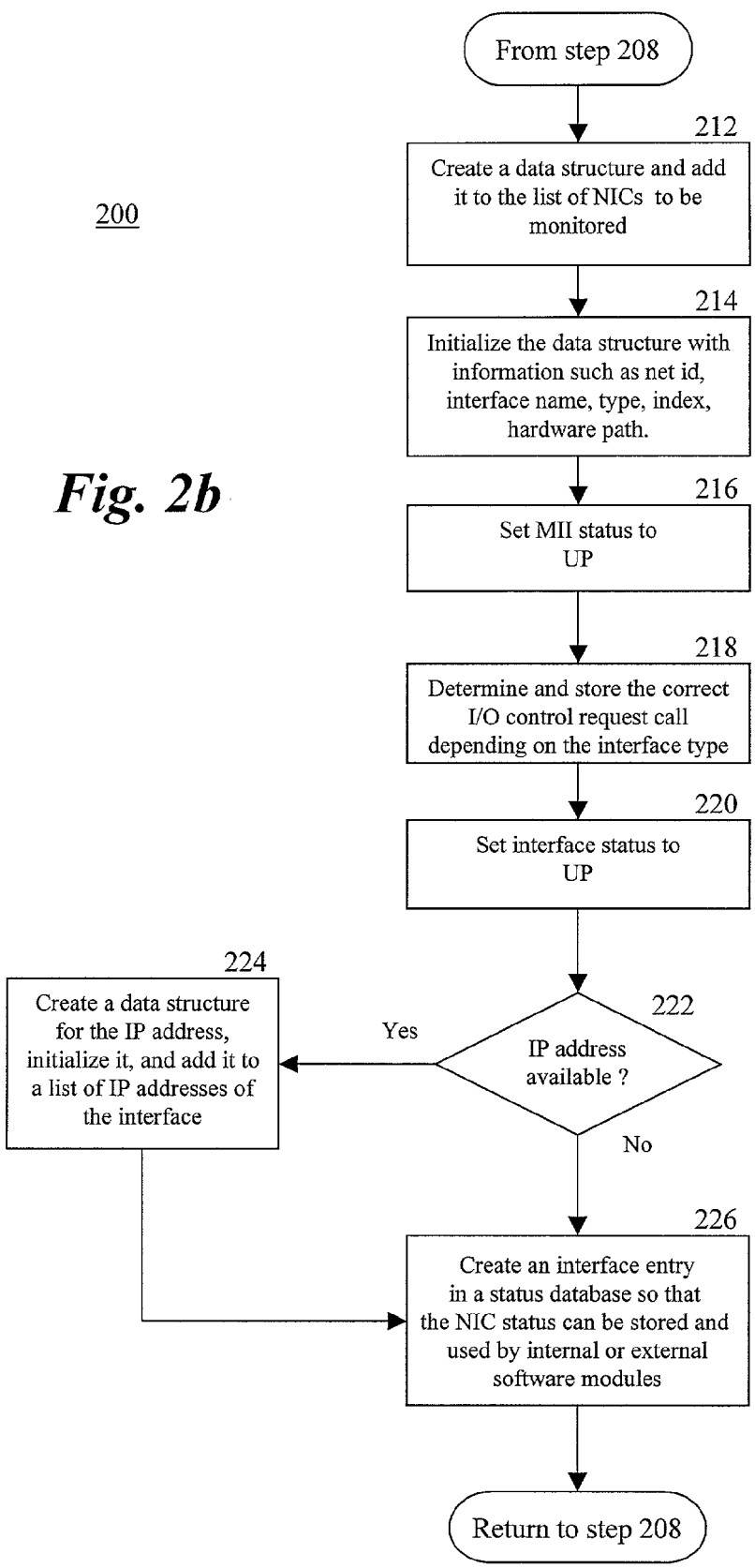
FIG. 2b is a flowchart showing a portion of the method of FIG. 2a in more detail.

FIG. 2b is a flowchart showing more detail of a portion of the method 200 for monitoring network interface cards for faults using the LINUX operating system. More specifically, FIG. 2b shows the step of creating and initializing data structures 190 for each network interface card 130 to be monitored (step 210) in more detail. This portion of the method 200 enters from step 208 shown on FIG. 2a.

For each network interface card 130, the network fault monitoring module 125 must create a data structure 190 to store data regarding the condition and status of the network interface card 130 and add the network interface card 130 and its data structure 190 to an interface data structure list 180 (step 212). The data structure 190 must then be initialized with information regarding the network interface card 130 (step 214), including the network identification 191, the network interface name 192, the network interface type 193, a network interface index 194, and a hardware path 196 of the network interface card 130. The network fault monitoring module 125 then sets a Media Independent Interface ("MII") status indicator 198 for the network interface card 130 being initialized to UP (step 216). It is also necessary to then ascertain the correct Input/Output ("I/O") control call request 157 (ioctl) depending upon the network interface type 193 of the network interface card 130 (step 218). Some interface cards will support an SIOCDEVPRIVATE I/O control request call 157, whereas other newer interface cards will utilize an SIOCGMIIPHY I/O control request call 157. This property of the network interface card 130 must be determined and stored in the correct I/O control request type field 195 for each network interface card 130 in order to make the appropriate I/O control request call 157 when monitoring each network interface card 130. An interface status indicator 199 for the network interface card 130 being initialized is then set to UP (step 220).

The network fault monitoring module 125 then checks to see if an Internet Protocol ("IP") address is available for the network interface card 130 (step 222). If an IP address is available, the network fault monitoring module 125 creates a data structure for the IP address, initializes the data structure, and adds the IP address to a list of IP addresses used by the network interface card 130 (step 224). If it is not necessary to add an IP address, or once an IP address has been added, then the next step is to create an entry 186 in the status reporting database 185 for the network interface card 130 (step 226). This enables the network fault monitoring module 125 to store the status of the network interface card 130 for use by other software modules. Following the establishment of the entry 186 in the status reporting database 185, the method 200 returns to step 208 to initialize a data structure 190 for another network interface card 130 or, if all the data structures 190 for all the network interface cards 130 have been initialized, proceed on to monitoring the network interface cards 130.

FIG. 2c is a flowchart showing more detail of another portion of the method 200 for monitoring network interface cards 130 for faults using the LINUX operating system. More specifically, FIG. 2c shows the step of monitoring the status of each of the network interface cards 130 in more detail. This portion of the method 200 enters from step 236 shown on FIG. 2a.

As long as the shutdown flag 170 is set to false, the network fault monitoring module 125 will execute the steps of the method 200 described below for monitoring the status of the network interface cards 130. Upon entering from step 236, the network fault monitoring module 125 first obtains the current system time in the form of clock ticks passed since reboot, for example, and adds the configurable polling interval 179, converted into ticks since reboot, for example, to derive the start time of the next polling interval (step 242). The method 200 then proceeds to loop through each of the network interface cards 130 that will be monitored (step 244), proceeding to execute the following status query steps for each network interface card 130.

The network fault monitoring module 125 begins the status query steps of the method 200 for each network interface card 130 by calling the appropriate I/O control request 157 (determined in step 218 above and stored in the correct I/O control request type field 195 for the network interface card 130) to query the link status of the network interface card 130 and store the returned value, either UP or DOWN, in the MII status indicator 198 assigned to the network interface card 130 being queried (step 246). Following this, the interface status indicator 199 is checked to determine if it is UP (step 248). If the interface status indicator 199 is not UP (i.e., is DOWN), then the MII status indicator 198 is checked to see if it is UP (step 250). If the MII status indicator 198 is not UP (i.e., is DOWN), then the network fault monitoring module 125 does nothing (step 254) and returns to step 244 to process the next network interface card 130. If, however, the MII status indicator 198 is UP, the network fault monitoring module 125 sets the interface status indicator 199 to UP (step 256), updates the status reporting database 185 with the newly set status so that other software modules may be notified of the status of the network interface card 130 (step 262), and then returns to step 244 to process the next network interface card 130, if any.

However, at step 248, if the interface status indicator 199 is UP, then the MII status indicator 198 is also checked to see if it is UP (step 252). In this case, with the interface status indicator 199 set to UP, if the MII status indicator 198 is set to UP, the network fault monitoring module 125 does nothing (step 260) and returns to step 244 to process the next network interface card 130, if any. If, however, the interface status indicator 199 is set to UP, and the MII status indicator 198 is not set to UP (i.e., is DOWN), the network fault monitoring module 125 then sets the interface status indicator 199 to DOWN (step 258), updates the status reporting database 185 with the newly set status so that other software modules may be notified of the status of the network interface card 130 (step 264), and then returns to step 244 to query the next network interface card 130, if any.

Once all the network interface cards 130 have been queried for the value of the interface status indicator 199 and MII status indicator 198 assigned to them (steps 244 through 264), the network fault monitoring module 125 performs a series of clean-up tasks. First, the network fault monitoring module 125 retrieves the current time (step 266), again in the format of clock ticks since reboot of the system, for example. The method then also unlocks the network mutex 172, thereby making data and system resources available to other processes (step 268).

The network fault monitoring module 125 then checks to see if the configurable poll interval 179 has expired (step 270) by checking the current system time (from step 266) against the predicted start time of the next poll interval calculated in step 242. If the configurable poll interval 179 has passed, and it is therefore time for another polling of the status of the network interface cards 130, the network fault monitoring module 125 locks the network mutex 172 (step 272) and returns to step 236 to check the shutdown flag 170. If, however, the configurable polling interval 179 has not expired, the network fault monitoring module 125 locks the poll mutex 175, preventing further polling of the network interface cards 130 (step 274), and proceeds to wait the necessary number of clock ticks until the configurable polling interval 179 has expired (step 276). Once the configurable polling interval 179 has expired, the network fault monitoring module 125 then unlocks the poll mutex 175 (step 278), locks the network mutex 172 (step 272), and returns to step 236 to check the shutdown flag 170.

The steps of the method 200 may be implemented with hardware or by execution of programs, modules or scripts. The programs, modules or scripts may be stored or embodied on one or more computer readable mediums in a variety of formats, including source code, object code or executable code, among other formats. The computer readable mediums may include, for example, both storage devices and signals. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the described methods can be configured to access, including signals downloaded through the Internet or other networks.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A system for monitoring network faults using a LINUX operating system comprising:
    means for establishing an electrical connection to a computer network running the LINUX operating system;
    means for controlling data sent across the establishing means;
    means for directly querying the status of the establishing means by accessing data structures that store network fault monitoring data in real time for use by other software modules, wherein the network fault monitoring data storage includes a storage for global variables including a shutdown flag, a network mutex, and a poll mutex;
    means for locking the network mutex prior to tracking and storing the status of the establishing means;
    means for tracking the status of the establishing means, comprising:
        means for obtaining a current time in clock ticks since rebooting of the LINUX operating system;
        means for adding the configurable polling interval to the current time to obtain the start time of the next polling interval, wherein the polling interval is configurable by users;
        means for querying the status of each network interface card;
        means for recalculating the current time;
        means for unlocking the network mutex;
        means for determining if the current polling interval has expired;
        means for locking the network mutex if the current polling interval has expired;
        means for locking the poll mutex if the current polling interval has not expired;
        means for waiting until the current polling interval has expired;
        means for unlocking the poll mutex; and
        means for locking the network mutex; and means for storing, in real time, the status of the establishing means in a status database for use by other software modules.

2. The system of claim 1, wherein the means for directly querying the status of the establishing means comprises means for fault monitoring.

3. The system of claim 2, wherein the fault monitoring means comprises:
   means for issuing an input/output control request call to means for controlling data sent across the establishing means, wherein the input/output control request call obtains the status of the establishing means; and
   means for recording the status of the establishing means with the tracking means.

4. The system of claim 3, wherein the input/output control request call conforms to and utilizes a standard Media Independent Interface.

5. The system of claim 4, wherein the input/output control request call comprises an SIOCDEVPRIVATE input/output control request call.

6. The system of claim 4, wherein the input/output control request call comprises an SIOCGMIIPHY input/output control request call.

7. An apparatus for monitoring network faults using a LINUX operating system comprising:
   a networked computer system comprising:
      a central processing unit ("CPU") running the LINUX operating system;
      a memory; and
      one or more network interface cards;
   a protocol stack within the LINUX operating system, the protocol tack comprising:
      a transport layer;
      a network layer; and
      a data link layer, the data link layer comprising one or more input/output control request that may directly query the status of the one or more network interface cards;
   a network fault monitoring module running on the CPU that polls and tracks the status of the one or more network interface cards in real time for use by other software modules, wherein the network fault monitoring module tracks the status of the one or more network interface cards by:
      obtaining a current time in clock ticks since rebooting of the LINUX operating system;
      adding the configurable polling interval to the current time to obtain the start time of the next polling interval, wherein the polling interval is configurable by users;
      querying the status of each network interface card;
      recalculating the current time;
      unlocking the network mutex;
      determining if the current polling interval has expired;
      locking the network mutex if the current polling interval has expired;
      locking the poll mutex if the current polling interval has not expired;
      waiting until the current polling interval has expired;
      unlocking the poll mutex; and
      locking the network mutex; and
   a network fault monitoring data storage residing in the memory that maintains network fault monitoring data tracking the status of the one or more network interface cards in real time for use by other software modules, wherein the network fault monitoring data storage includes a storage for global variables including a shutdown flag, a network mutex, and a poll mutex,
   wherein the network fault monitoring module locks the network mutex prior to monitoring the status of the one or more network interface cards.

8. The apparatus of claim 7, wherein the one or more input/output control requests conform to and utilize a standard Media Independent Interface.

9. The apparatus of claim 8, wherein the one or more input/output control requests comprise SIOCDEVPRIVATE input/output control request calls.

10. The apparatus of claim 8, wherein the one or more input/output control requests comprise SIOCGMIIPHY input/output control request calls.

11. A method for monitoring network faults using a LINUX operating system comprising:
   initializing data structures for tracking the status of one or more network interface cards to be monitored in real time for use by other software modules running the LINUX operating system, wherein each data structure stores network fault monitoring data and includes a storage for global variables including a shutdown flag, a network mutex, and a poll mutex;
   initializing monitoring of the one or more network interface cards;
   ascertaining a configurable polling interval;
   locking a network mutex prior to monitoring the status of the one or more network interface cards;
   determining if a shutdown condition has occurred by checking the shutdown flag;
   monitoring the status of the one or more network interface cards in real time for use by other software modules when a shutdown condition has not occurred, wherein the monitoring step comprises:
      obtaining a current time in clock ticks since rebooting of the LINUX operating system;
      adding the configurable polling interval to the current time to obtain the start time of the next polling interval, wherein the polling interval is configurable by users;
      querying the status of each network interface card;
      recalculating the current time;
      unlocking the network mutex;
      determining if the current polling interval has expired;
      locking the network mutex if the current polling interval has expired;
      locking the poll mutex if the current polling interval has not expired;
      waiting until the current polling interval has expired;
      unlocking the poll mutex; and
      locking the network mutex;
   storing, in real time, the status of the one or more network interface cards in a status database for use by other software modules; and
   clearing all resources when a shutdown condition has occurred.

12. The method of claim 11, wherein the initializing step comprises:
   initializing the network mutex, the poll mutex, and a poll conditional variable;
   setting a shutdown flag to false; and
   opening a datagram socket for use in calling an input/output ("I/O") control control request to query link status of the network interface cards.

13. A method for monitoring network faults using a LINUX operating system comprising:

initializing data structures for tracking the status of one or more network interface cards to be monitored in real time for use by other software modules running the LINUX operating system, wherein each data structure stores network fault monitoring data and includes a storage for global variables including a shutdown flag, a network mutex, and a poll mutex, wherein the initializing step comprises:
  initializing a network mutex, a poll mutex, and a poll conditional variable;
  setting a shutdown flag to false; and
  opening a datagram socket for use in calling an input/output ("I/O") control request to query link status of the network interface cards,
wherein the initializing step further comprises executing the following steps for all network interface cards:
  creating a data structure and add it to a list of network interface cards to be monitored;
  initializing the created data structure with information describing the network interface card, where the information comprises a unique network identification number, a network interface name, a network interface index, an indicator of the type of network interface card, and the hardware path to the network interface card;
  setting a Media Independent Interface ("MII") status indicator to up;
  selecting a correct input/output ("I/O") control request call for the type of the network interface card;
  setting an interface status indicator to up;
  if a new Internet Protocol ("IP") address is available for the network interface card, creating a data structure for the IP address, initializing the data structure, and adding it to a list of IP addresses assigned to the network interface card; and
  creating an entry for the network interface card in a status database to enable storage of status data for use by other software modules;
initializing monitoring of the one or more network interface cards;
ascertaining a configurable polling interval;
locking a network mutex prior to monitoring the status of the one or more network interface cards;
determining if a shutdown condition has occurred by checking the shutdown flag;
monitoring the status of the one or more network interface cards in real time for use by other software modules when a shutdown condition has not occurred;
storing, in real time, the status of the one or more network interface cards in a status database for use by other software modules; and
clearing all resources when a shutdown condition has occurred.

14. The method of claim 11, wherein the querying step comprises:
  calling the correct I/O control request to query the status of the network interface card;
  storing the value returned by the I/O control request in the MII status indicator for the network interface card;
  determining if the interface status indicator is set to up or down;
  making no change to the status database if the interface status indicator is not set to up and the Mu status indicator is not set to up;
  making no change to the status database if the interface status indicator is set to tip and the Mu status indicator is set to up;
  setting the interface status indicator to up and updating the status database to reflect the new status of the network interface card if the interface status indicator is not set to up but the Mu status indicator is set to up; and
  setting the interface status indicator to down and updating the status database to reflect the new status of the network interface card if the interface status indicator is set to up and the Mu status indicator is not set to up.

15. A computer readable medium upon which is embedded instructions for carrying out a method for monitoring network faults using a LINUX operating system, the method comprising steps for:
  initializing data structures for tracking the status of one or more network interface cards to be monitored in real time for use by other software modules running the LINUX operating system, wherein each data structure stores network fault monitoring data and includes a storage for global variables including a shutdown flag, a network mutex, and a poll mutex;
  initializing monitoring of the one or more network interface cards;
  ascertaining a configurable polling interval;
  locking a network mutex prior to monitoring the status of the one or more network interface cards;
  determining if a shutdown condition has occurred by checking the shutdown flag;
  monitoring the status of the one or more network interface cards in real time for use by other software modules when a shutdown condition has not occurred, wherein the monitoring step comprises:
    obtaining a current time in clock ticks since rebooting of the LINUX operating system;
    adding the configurable polling interval to the current time to obtain the start time of the next polling interval;
    querying the status of each network interface card;
    recalculating the current time;
    unlocking the network mutex;
    determining if the current polling interval has expired;
    locking the network mutex if the current polling interval has expired;
    waiting until the current polling interval has expired;
    unlocking the poll mutex; and
    locking the network mutex;
  storing, in real time, the status of the one or more network interface cards in a status database for use by other software modules; and
  clearing all resources when a shutdown condition has occurred.

16. The computer readable medium of claim 15, wherein the initializing step comprises:
  initializing the network mutex, the poll mutex, and a poll conditional variable;
  setting a shutdown flag to false; and
  opening a datagram socket for use in calling an input/output ("I/O") control request to query link status of the network interface cards.

17. A computer readable medium upon which is embedded instructions for carrying out a method for monitoring network faults using a LINUX operating system, the method comprising steps for:
  initializing data structures for tracking the status of one or more network interface cards to be monitored in real time for use by other software modules running the LINUX operating system, wherein each data structure stores network fault monitoring data and includes a storage for global variables including a shutdown flag, a network mutex, and a poll mutex, wherein the initializing step comprises:

initializing the network mutex, the poll mutex, and a poll conditional variable;

setting a shutdown flag to false; and opening a datagram socket for use in calling an input/output ("I/O") control request to query link status of the network interface cards, wherein the initializing step further comprises executing the following steps for all network interface cards:

creating a data structure and add it to a list of network interface cards to be monitored;

initializing the created data structure with information describing the network interface card, where the information comprises a unique network identification number, a network interface name, a network interface index, an indicator of the type of network interface card, and the hardware path to the network interface card;

setting a Media Independent Interface ("MII") status indicator to up;

selecting a correct input/output ("I/O") control request call for the type of the network interface card;

setting an interface status indicator to up;

if a new Internet Protocol ("IP") address is available for the network interface card, creating a data structure for the IP address, initializing the data structure, and adding it to a list of IP addresses assigned to the network interface card; and creating an entry for the network interface card in a status database to enable storage of status data for use by other software modules;

initializing monitoring of the one or more network interface cards;

ascertaining a configurable polling interval;

locking a network mutex prior to monitoring the status of the one or more network interface cards;

determining if a shutdown condition has occurred by checking the shutdown flag;

monitoring the status of the one or more network interface cards in real time for use by other software modules when a shutdown condition has not occurred;

storing, in real time, the status of the one or more network interface cards in a status database for use by other software modules; and clearing all resources when a shutdown condition has occurred.

18. The computer readable medium of claim 15 wherein the querying step comprises:

calling the correct I/O control request to query the status of the network interface card;

storing the value returned by the I/O control request in the Mu status indicator for the network interface card;

determining if the interface status indicator is set to up or down;

making no change to the status database if the interface status indicator is not set to up and the Mu status indicator is not set to up;

making no change to the status database if the interface status indicator is set to up and the Mu status indicator is set to up;

setting the interface status indicator to up and updating the status database to reflect the new status of the network interface card if the interface status indicator is not set to up but the Mu status indicator is set to up; and setting the interface status indicator to down and updating the status database to reflect the net status of the network interface card if the interface status indicator is set to up and the Mu status indicator is not set to up.

* * * * *

UNITED STATES PATENT AND TRADEMARK OFFICE
CERTIFICATE OF CORRECTION

| | |
|---|---|
| PATENT NO. | : 7,296,069 B2 |
| APPLICATION NO. | : 10/140214 |
| DATED | : November 13, 2007 |
| INVENTOR(S) | : Hoa Nguyen |

It is certified that error appears in the above-identified patent and that said Letters Patent is hereby corrected as shown below:

In column 9, line 10, in Claim 3, insert -- the -- before "means for".

In column 10, line 13, in Claim 10, delete "SIOCGMIJPHY" and insert -- SIOCGMIIPHY --, therefor.

In column 10, line 64, in Claim 12, delete "control" before "request".

In column 11, line 63, in Claim 14, delete "Mu" and insert -- MII --, therefor.

In column 11, line 66, in Claim 14, delete "tip" and insert -- up --, therefor.

In column 11, line 66, in Claim 14, delete "Mu" and insert -- MII --, therefor.

In column 12, line 4, in Claim 14, delete "Mu" and insert -- MII --, therefor.

In column 12, line 8, in Claim 14, delete "Mu" and insert -- MII --, therefor.

In column 14, line 18, in Claim 18, delete "Mu" and insert -- MII --, therefor.

In column 14, line 22, in Claim 18, delete "Mu" and insert -- MII --, therefor.

In column 14, line 25, in Claim 18, delete "Mu" and insert -- MII --, therefor.

In column 14, line 30, in Claim 18, delete "Mu" and insert -- MII --, therefor.

UNITED STATES PATENT AND TRADEMARK OFFICE
CERTIFICATE OF CORRECTION

PATENT NO. : 7,296,069 B2
APPLICATION NO. : 10/140214
DATED : November 13, 2007
INVENTOR(S) : Hoa Nguyen It is certified that error appears in the above-identified patent and that said Letters Patent is hereby corrected as shown below:

In column 14, line 34, in Claim 18, delete "Mu" and insert -- MII --, therefor.

Signed and Sealed this

Fourteenth Day of July, 2009

JOHN DOLL
*Acting Director of the United States Patent and Trademark Office*